United States Patent [19]

Nguyen

[11] Patent Number: 5,350,493
[45] Date of Patent: Sep. 27, 1994

[54] OXYGEN DELIGNIFICATION OF OLD CORRUGATED CONTAINERS

[75] Inventor: Xuan T. Nguyen, Montreal, Canada
[73] Assignee: Domtar, Inc., Montreal, Canada
[21] Appl. No.: 170,154
[22] Filed: Dec. 20, 1993

Related U.S. Application Data

[62] Division of Ser. No. 837,870, Feb. 18, 1992, Pat. No. 5,302,244.

[51] Int. Cl.$^5$ ............................................. D21C 5/02
[52] U.S. Cl. ........................................... 162/6; 162/8; 162/65
[58] Field of Search ................................. 162/6, 8, 65

[56] References Cited

U.S. PATENT DOCUMENTS

| | | | |
|---|---|---|---|
| 3,769,152 | 10/1973 | Samuelson et al. | 162/65 |
| 4,259,150 | 3/1981 | Prough | 162/40 |
| 4,946,556 | 8/1990 | Prough | 162/60 |
| 5,211,809 | 5/1993 | Naddeo et al. | 162/6 |

FOREIGN PATENT DOCUMENTS

| | | |
|---|---|---|
| 885903 | 11/1971 | Canada . |
| 401149 | 12/1990 | European Pat. Off. . |

OTHER PUBLICATIONS

Angulo "Environmentally Safe Bleaching of Post Consumer Waste Paper" TAPPI Pulping Conference Oct. 1990.
TAPPI Journal, 1986, "Upgrading of Pulp from Corrugated Containers by Oxygen delignification" deRuvo et al.
Markham et al "Oxygen Bleaching of Secondary Fiber Grades" TAPPI Journal 1988.

*Primary Examiner*—Karen M. Hastings
*Attorney, Agent, or Firm*—Bachman & LaPointe

[57] ABSTRACT

Waste cellulosic paper products, for example, old corrugated container are recycled employing oxygen delignification in the presence of an alkaline material to produce a recycled pulp of lower kappa number, while maintaining adequate strength in the pulp. The recycling process preferably employs an acid pretreatment in combination with the oxygen delignification, and exposure of the waste product to the alkaline material is preferably controlled so that at any point in the delignification the waste product is exposed to not more than 50%, by dry weight, of the alkaline material based on the weight of residual lignin in the waste paper product.

6 Claims, 2 Drawing Sheets

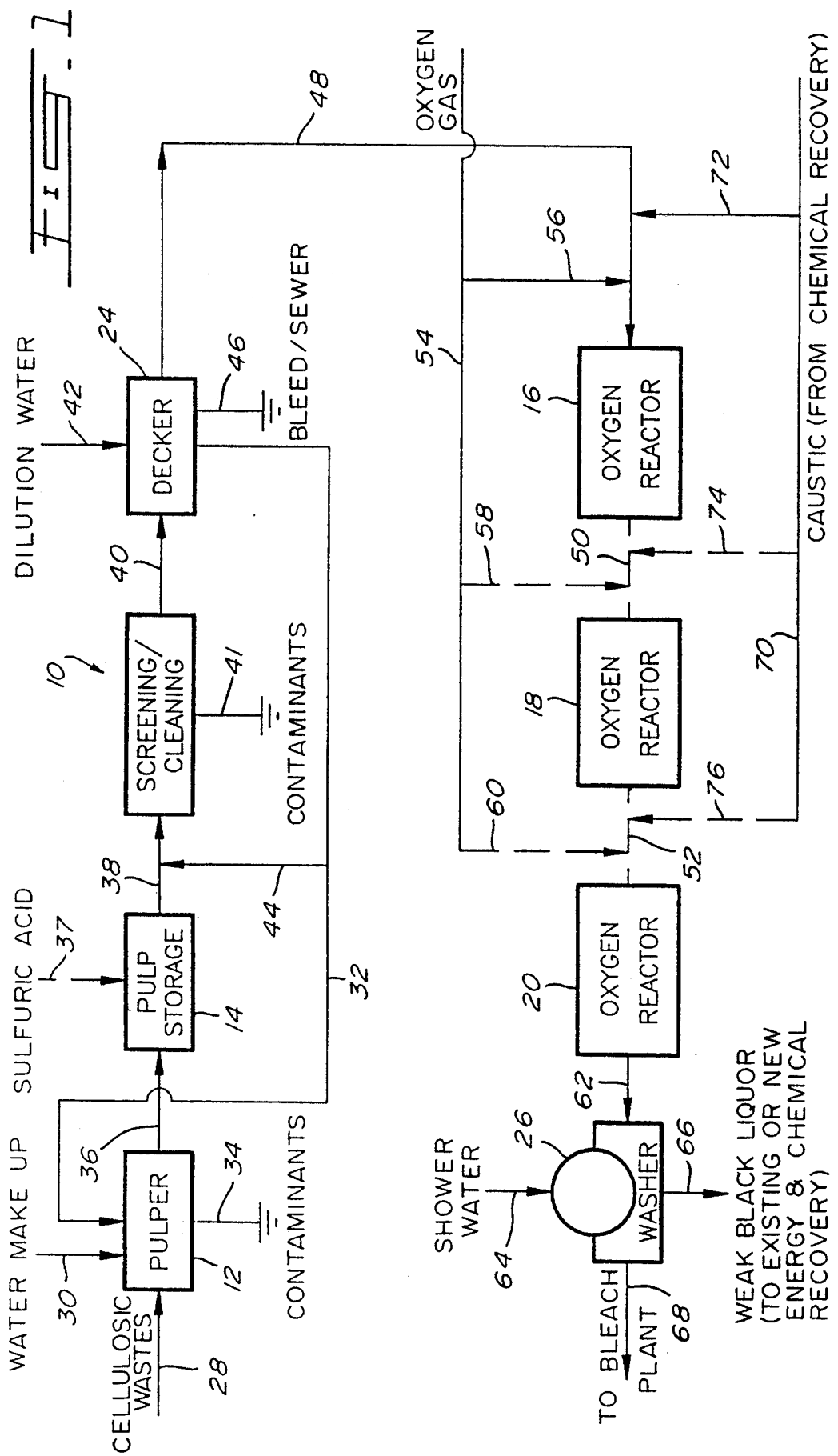

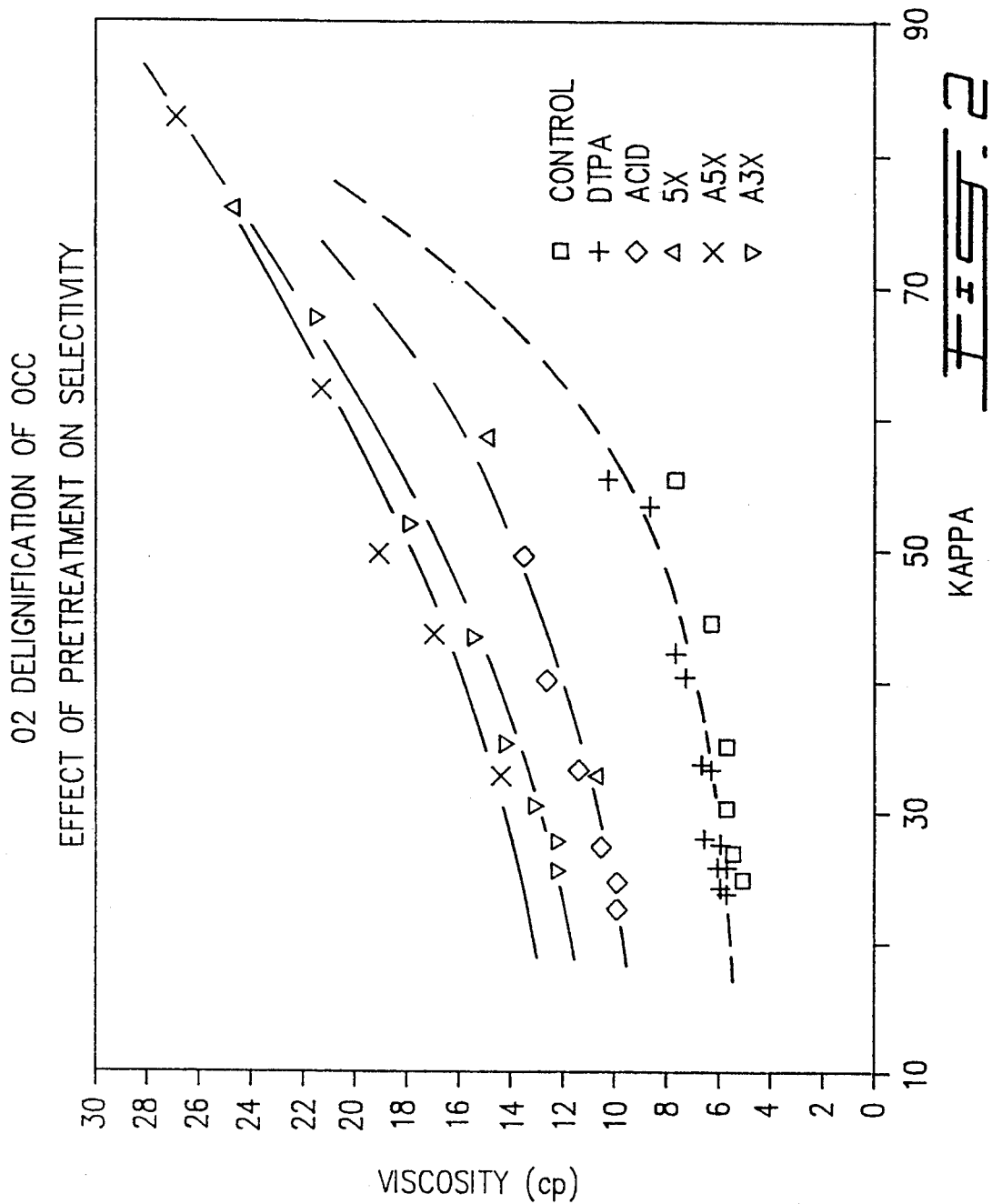

OXYGEN DELIGNIFICATION OF OLD CORRUGATED CONTAINERS

This is a division, of application Ser. No. 07/837,870, filed Feb. 18, 1992 now U.S. Pat. No. 5,302,244.

BACKGROUND OF THE INVENTION

1. Field of the Invention

This invention relates to a process and apparatus for recycling waste cellulosic material to produce a bleachable cellulosic fiber pulp. The invention is especially concerned with recycling waste corrugated paperboard.

2. Description of Prior Art

Corrugated containers are normally produced with linerboard and a corrugating medium. High yield softwood kraft is usually the pulp used to produce linerboard, while high yield semi-chem hardwood is the normal pulp for making corrugating medium. The common characteristic of these pulps is their high lignin content. Linerboard pulps contain about 10% lignin, corresponding to a kappa of about 70. Corrugating medium pulps have about 18% lignin, corresponding to about 120 kappa. The lignin content of corrugated containers is therefore of the order of 12–14%, corresponding to about 90 kappa (% lignin≃kappa×0.15).

Old corrugated containers (OCC) have traditionally been considered paper waste, which usually ends up in a landfill site. The extent of recycling of OCC for making recycled linerboard and corrugating medium paper products is currently at 40% at most. The strength of old corrugated containers, due to their usage and recycled fiber content, is known to be very low, corresponding to a viscosity of about 28 to 32 by TAPPI T-230 Method For reference purposes, the TAPPI viscosities of virgin linerboard and corrugating medium pulps are as high as 50 to 60.

In order to increase the percentage of OCC which can be recycled and used in the manufacture of high quality linerboard, a method of delignifying OCC with oxygen in the presence of an alkali has been proposed by A. de Ruvo, P. A. Farnstrand and N. Hagen in an article presented at the 1985 TAPPI pulping conference. The proposed oxygen delignification of OCC was said to result in substantial loss of the OCC viscosity. As illustrated in this publication, when the kappa of OCC was reduced from 70 to 28, with the viscosity of OCC was a low as 265 by SCAN C15:62 method, which is equivalent to 3.0 by TAPPI T-230 method.

In order to economically bleach high kappa virgin pulp rejects such as knots, shives, chops and partially cooked chips, U.S. Pat. No. 4,435,249 proposes to delignify these pulp rejects with oxygen in the presence of an alkali chemical. The objective was to reduce their kappa from about 90 to about 20 to 30, at which kappa they can be economically bleached, while meeting environmental regulations. The bleaching of these low kappa pulps is designed to substantially remove the residual lignin content and to brighten the pulp, which can then be used to produce wood-free (by which is meant lignin-free) printing and writing paper grades.

Oxygen delignification, when used on unbleached pulps to reduce their lignin fraction, is known to simultaneously degrade the cellulose fraction. This undesirable cellulose degradation is also known to be responsible for the observed loss in the pulp viscosity and has usually dictated how low in kappa the pulp can be delignified while maintaining a minimum viscosity/strength for making papers.

The strength of fully bleached pulps, used on commercial paper machines to produce these fine paper grades has to be very high. For these pulps, a TAPPI viscosity of at least 10 is usually the minimum requirement to operate the paper machine with good efficiency and to produce papers with satisfactory strength.

The bleaching of softwood kraft pulps usually commences with unbleached pulps with a kappa of 30 to 35 range. In order to reduce the bleaching cost, U.S. Pat. No. 4,946,556 proposed the use of oxygen delignification to reduce the kappa of unbleached pulps to less than 10. Similarly, to minimize the viscosity loss associated with the delignification, oxygen treatment in multistages, together with countercurrent pulp washing between oxygen stages was proposed as a necessary requirement. More viscosity protection was also found when a chelating agent such as EDTA was added to the countercurrent wash liquid and/or pulps were pretreated with a chelating agent such as DTPA. Interstage pulp washing, as taught in the U.S. patent, has been known to substantially increase the complexity and cost of carrying out the oxygen delignification, for example more than double the capital expenses and operating cost.

SUMMARY OF THE INVENTION

The present invention is based on the recognition that loss in strength during the oxygen delignification of high kappa cellulosic waste material is due to two factors, namely the contamination of the cellulosic waste material through historical handling, and high caustic concentrations of the digesting liquor required to solubilize the substantial amount of oxidized lignin present in the waste.

It is therefore an object of the invention to provide a process for recycling waste cellulosic materials while minimizing the associated viscosity loss. Such waste materials include paperboard, especially corrugated paperboard.

It is a further object of this invention to provide recycled paperboard, especially recycled corrugated paperboard, linerboard, and old corrugated containers.

It is still a further object of this invention to provide a recycled pulp, and a process for its production, from waste cellulosic paper products and reject pulp, which recycled pulp has a lower kappa number than that of the waste and which can be employed in part or as the sole pulp in paper product manufacture.

It is yet another object of this invention to provide such a process to produce a recycled pulp of low kappa number and high viscosity suitable for bleaching to produce white paper products.

Thus in accordance with one aspect of the invention there is provided a process for recycling waste cellulosic paper product comprising subjecting a waste cellulosic paper product having a first kappa number to a pretreatment with an aqueous acid nondetrimental to cellulose, and subjecting the thus pretreated waste product to oxygen delignification in the presence of an alkaline material to produce a cellulosic fiber pulp having a viscosity of at least 10 and a second kappa number lower than said first kappa number.

In accordance with another aspect of the invention there is provided a process for recycling waste cellulosic paper comprising subjecting a waste cellulosic paper product having a first kappa number to oxygen delignification in an aqueous medium in the presence of an alkaline material, in which said waste cellulosic paper product is exposed to alkaline material, and establishing a condition for the delignification in which the waste product is exposed to no more than about 50%, by dry weight, of the alkaline material, based on the weight of residual lignin in the waste cellulosic product, at any point during the delignification.

In a particular embodiment of the invention there is provided a cellulosic fiber pulp having a viscosity of at least 10 and a kappa number of 15 to 35 derived from oxygen delignification of waste cellulosic paper products having a kappa number of at least 70.

DESCRIPTION OF PREFERRED EMBODIMENTS i) Acid Pretreatment

In one preferred embodiment of the invention waste cellulosic paper product is subjected to a pretreatment prior to oxygen delignification, with an aqueous mineral acid, and more preferably an acid which is non-detrimental to cellulose.

Suitably the waste cellulosic paper product is washed with the aqueous acid solution which preferably has a concentration in the solution effective to provide a pH of 2 to 4.

A preferred acid is sulfuric acid in a concentration of 0.5 to 1.5%, by weight, based on the weight of the aqueous sulfuric acid solution.

Other suitable acids include sulphurous acid, hypochlorous acid, hydrochloric acid and nitric acid.

Nitric acid is less preferred because of its corrosive nature. Chlorine based acids are generally less preferred because of the general preference for avoiding or minimizing introduction of chlorine, in any form, into the pulp.

The acid pretreatment is suitably carried out at a temperature of 20° to 60° C., preferably about 50° C., for a time of 20 to 40, preferably about 30 minutes.

Conveniently the waste cellulosic paper product is reslushed with water, and the aqueous acid is added to the reslushed waste paper product, whereafter an acid removal step is suitably carried out by washing or dewatering or both. Removal of the acid is appropriate to avoid waste of alkaline material in the subsequent oxygen delignification step.

ii) Oxygen Delignification

In accordance with the invention the waste cellulosic paper product is subjected to oxygen delignification in the presence of an alkaline material. Preferred alkaline materials include the alkali metal hydroxides, especially sodium hydroxide. The alkaline material serves to dissolve oxidized products of the delignification so that they can be removed from the resulting cellulose fiber pulp which is the desired recycled pulp product.

Suitably the oxygen delignification is carried out on waste cellulosic paper product which has been reslushed in water, and which has preferably been subjected to the above mentioned acid pretreatment, followed by an acid removal step such as by washing and/or dewatering.

The oxygen delignification is suitably carried out at a temperature of 80° to 120° C. and at an oxygen pressure to maintain the aqueous medium of the reslushed waste product saturated with oxygen. In general an oxygen pressure of 60 to 120, preferably about 100 psig, is appropriate.

The oxygen delignification is typically carried out for a time of 30 to 120 minutes, depending on the temperature. In general a decrease in operating temperature of about 10° C. will double the delignification time while an increase in operating temperature of about 10° C. will halve the required delignification time.

The alkaline material is employed in the oxygen delignification in an amount such that the lignin-containing waste cellulosic paper product is exposed to not more than 50% by dry weight of the alkaline material, based on the weight of residual lignin in the waste product. Exposure of the waste product to higher concentrations of alkaline material results in significant loss of strength in the fiber of the resulting pulp.

In order to produce paper products of satisfactory strength the recycled pulp should have a viscosity of at least 10, as measured by TAPPI T-230.

In accordance with the invention it is found that lass of viscosity or strength during oxygen delignification is avoided or minimized by controlling the exposure of the waste product to the alkaline material such that the waste product is exposed, at any point of the delignification, to no more than 50% by dry weight of the alkaline material, based on the weight of residual lignin in the waste product.

The control of the exposure of the waste product to the alkaline material may be achieved by introducing dosages of the alkaline material sequentially to the lignin-containing waste product during oxygen delignification, each dosage amounting to not more than about 50%, by dry weight, based on the dry weight of lignin contained in the waste product.

In particular this may be achieved by means of a plurality of separate oxygen reactors, and feeding the lignin-containing product sequentially from a first upstream oxygen reactor to a second oxygen reactor downstream of the first reactor. In this way the lignin-containing product passes sequentially through the plurality of oxygen reactors, and is exposed in each reactor to oxygen delignification conditions in the presence of a low concentration of the alkaline material.

A separate low dosage or proportion of the alkaline material is introduced into each oxygen reactor, each dosage amounting to not more than 50% dry weight of alkaline material, based on the weight of the residual lignin in the lignin containing product.

Suitably the flow of lignin-containing product through the reactors is such that the alkaline material in an upstream oxygen reactor has been substantially fully consumed before the treated lignin-containing product flows to a downstream reactor for further delignification.

Suitably the oxygen and the alkaline material are injected at an inlet to each reactor.

If the alkaline material is not fully consumed an appropriate lowering of the dosage of alkaline material introduced into the downstream reactor is required so that the lignin-containing product in such downstream reactor is exposed to not more than 50%, by dry weight, of the alkaline material. It will be recognized that this represents a less efficient mode of operation.

The oxygen delignification is thus carried out in a plurality of sequentially arranged oxygen reactors without the need for intermediate washing stages.

iii) Waste Cellulosic Paper Product

The invention is concerned with recycling of waste cellulosic paper products of relatively high lignin content, and in particular with a kappa number of at least 70, and more typically 80 to 180.

In accordance with the invention 'waste cellulosic paper product' contemplates manufactured paper products which have been used by consumers and have thus been subjected to an aging process. These may be termed post-consumer paper products, in that they have been used by the consumer and have either outlived their useful life or have fulfilled the need for which they were intended. Examples include paperboard packaging, which is used to package consumer products and which is usually discarded by the consumer after purchase of the product. At the point in time at which the packaging is discarded it has frequently been subjected to different handling and manipulating operations, as well as aging, all of which contribute to deterioration of the cellulosic fiber content to an extent such that the conventional wisdom is that such discarded product is unsuitable for recycling to produce quality paper products. Conventionally, recycled pulp from such discarded paperboard is employed for low quality, inferior paper products, or as a minor component mixed with virgin pulp to reduce costs of other paper products.

Old corrugated containers (OCC) have particular utility as the waste product in the present invention.

iv) Post-treatment

The cellulosic pulp or recycled pulp resulting from the oxygen delignification is recovered as a brownstock which is washed to produce the recycled brownstock pulp and a brownstock washing liquor or weak black liquor which contains inorganic chemicals and combustible organic substances formed during the delignification.

A concentrate may be formed of the brownstock liquor. Combustion of the organic component provides heat energy which may be exploited in the process to provide part of the heat to raise the temperature for the acid pretreatment or oxygen delignification. Sodium carbonate by-product typically forms as a molten mass during the combustion of the concentrate and may be dissolved in water and reacted with quicklime to convert the sodium carbonate to sodium hydroxide with precipitation of calcium carbonate to leave a liquor of sodium hydroxide which can be recycled to the oxygen delignification stage.

The recycled pulp may be employed directly as the sole component of a new manufactured paper product or may be admixed with virgin pulp.

The recycled pulp may be subjected to bleaching where white paper products are required.

v) Recycled Pulp

The recycled pulp of the invention typically has a kappa number of 15 to 35, more usually 20 to 30, and has a viscosity of at least 10 and typically 10 to 15.

The cellulosic fiber pulp has, in particular, an ISO brightness of at least 30 and a fiber strength of at least 11 km.

It is a particular advantage of the invention that superior characteristics of ISO brightness and fiber strength are attained in conjunction with the high viscosity and low kappa.

It was surprising that a recycled pulp of this character could be produced employing oxygen delignification of waste cellulosic paper product such as OCC, since first oxygen delignification is known to seriously reduce viscosity and thus strength of the cellulosic fiber pulp, and second OCC was generally considered unsuitable for producing a quality pulp because of the aging of the paper product which has been generally recognized as producing deterioration of the fiber content, particularly with respect to strength characteristics.

The high brightness of the pulp, typically at least 30, means that less bleaching agent is required in subsequent operations directed to increasing the brightness of white paper products produced from the recycled pulp.

The superior physical characteristics of the recycled pulp of the invention are such that the recycled pulp may be employed directly as the sole component of a new manufactured paper product.

BRIEF DESCRIPTION OF DRAWINGS

FIG. 1 illustrates schematically a recycling assembly and the process for recycling washed cellulosic paper product in accordance with the invention; and FIG. 2 illustrates a variation of viscosity of the recycled pulp with kappa number for different oxygen delignification processes including processes of the invention.

DESCRIPTION OF PREFERRED EMBODIMENTS WITH REFERENCE TO THE DRAWINGS

With further reference to FIG. 1, a recycling assembly 10 includes a pulper 12, an acidification tank 14 and oxygen reactors 16, 18 and 20.

Recycling assembly 10 further includes a screening/cleaning tank 22, a decker 24 and a washer 26.

Pulper 12 includes a feed inlet line 28 for waste cellulosic paper products, a water inlet line 30 for makeup water, a recycled water inlet line 32 and a contaminants outlet line 34.

A line 36 communicates pulper 12 with acidification tank 14, and an acid inlet line 37 communicates with acidification tank 14.

A line 38 communicates acidification tank 14 with screening/cleaning tank 22 and a line 40 communicates screening/cleaning tank 22 with decker 24.

Screening/cleaning tank 22 has a contaminants outlet line 41; and decker 24 has a dilution water line 42 and a sewer line 46.

The recycled water line 32 communicates decker 24 with pulper 12 and a branch line 44 communicates recycled water line 32 with line 38.

Line 48 communicates decker 24 with the upstream oxygen reactor 16; line 50 communicates upstream oxygen reactor 16 with intermediate oxygen reactor 18 and line 52 communicates intermediate oxygen reactor 18 with downstream oxygen reactor 20.

An oxygen line 54 has oxygen branches 56, 58 axed 60 communicating with lines 48, 50 and 52, respectively.

A line 62 communicates downstream oxygen reactor 20 with washer 26.

Washer 26 includes a shower water line 64, a brown stock wash liquor line 66 and a product line 68.

A caustic line 70 has caustic branches 72, 74 and 76 which communicate with lines 48, 50 and 52, respectively.

A particular process of the invention is further described with reference to FIG. 1: Waste cellulosic paper product is fed through feed inlet line 28 to pulper 12. In pulper 12 the waste product is reslushed with water provided through water inlet 30 and recycled water line 32. Contaminants which settle in pulper 12 are removed through contaminants outlet line 34.

The aqueous reslushed pulp is fed through line 36 from pulper 12 to acidification tank 14 in which the pulp is acidified to a pH of about 2 to 4 with sulfuric acid introduced through acid inlet line 37. Suitably the acidification takes place at a temperature of about 50° C. for a time of about 30 minutes.

Thus, treated pulp is fed from acidification tank 14 to screening/cleaning tank 22 in which screening and cleaning of the pulp occurs and contaminants are removed through contaminants outlet line 41. The thus, screened and cleaned pulp is fed through line 40 to decker 24 where it is washed with water introduced through dilution water line 42. A portion of water in decker 24 with settling contaminants is removed through sewer line 46 and a portion of the dilution water in decker 24 is recycled through recycled water line 32 to pulper 12, and through branch line 44 to line 38.

The thus prepared pulp is now ready for oxygen delignification and is fed sequentially through oxygen reactors 16, 18 and 20 employing lines 48, 50 and 52. Oxygen gas is introduced through oxygen line 54 and feeds oxygen branches 56, 58 and 60 which feed lines 48, 50 and 52 upstream of the reactors 16, 18 and 20, respectively. The oxygen is suitably introduced so that oxygen saturation occurs in the oxygen reactors 16, 18 and 20 and the reactors are suitably maintained at a temperature of 80° to 120° C., with the pulp being maintained in each reactor for a period of 30 to 120 minutes to effect delignification of the waste product.

Caustic, i.e. sodium hydroxide is introduced through line 70 to caustic branches 72, 74 and 76 which communicate with lines 48, 50 and 52, respectively, at a point just upstream of the introduction of oxygen to such lines through lines 56, 58 and 60, respectively.

The introduction of caustic is controlled so that the amount of caustic in each of the oxygen reactors 16, 18 and 20 is not more than 50% by dry weight based on the weight of residual lignin in the waste paper product.

Delignified pulp is fed from oxygen reactor 20 to washer 26 where it is washed with water from shower water line 64. The brown stock wash liquor is removed through line 66 and the delignified pulp is removed through product line 68.

The delignified pulp may be employed as is in paper product manufacture or may be first subject to bleaching in a bleach plant.

The brown stock wash liquor removed through line 66 may be employed to develop heat energy for the recycling assembly 10, by combustion of organic combustible components of the liquor, and caustic may be regenerated from such liquor and fed to caustic line 70.

EXAMPLES

The following example serve to illustrate particular aspects of the invention and improvements over the prior art; in these examples, yields and chemical charges are all expressed in weight %, based on dry weight of pulp.

EXAMPLE 1

A commercial corrugated paperboard waste was reslushed with water and sulfuric acid was added to a dosage of 1% based on dry waste material. The original waste had a kappa of 82.8 and a TAPPI viscosity of 26.7. The reslushed and acid washed waste at 5% consistency was maintained at 50° C. for 30 minutes, after which it was washed with water and dewatered to about 10% consistency. The thus pretreated waste was digested with 5% caustic (NaOH) and 0.5% magnesium sulphate (MgSO4), at 100° C. and in the presence of 100 psig oxygen gas for about 25 minutes until the pH of the mixture decreased to about 10.5, indicating that all NaOH was consumed. NaOH was again added at 4% dosage and the oxygen delignification continued until the additional NaOH was substantially consumed. NaOH at 3% was again added and the oxygen delignification process step was repeated until the NaOH dosage was consumed. At completion a total of 12% NaOH had been employed. The combined waste treatment process steps produce a pulp product with a yield of 82% on original waste. The recycled pulp product had a kappa of 25.3, a viscosity of 12.2, an ISO brightness of 39.6 and a fiber strength of 12 km.

EXAMPLE 2

A treatment of commercial waste following the procedure of Example 1 was carried out, but instead of NaOH dosages of 5%, 4% and 3%, five equal NaOH dosages of 2% were used. The recycled pulp product had a kappa of 32.4, a TAPPI viscosity of 14.4, an ISO brightness of 33.9 and a fiber strength of 12 km.

EXAMPLE 3

Commercial waste as in Example 1 was reslushed with water to a consistency of about 10%. The reslushed waste was digested with 2% NaOH and 0.5% MgSO4, at 100° C. and in the presence of 100 psig oxygen gas for about 15 minutes, until all NaOH was consumed. NaOH was again added at 2% and the oxygen delignification was again carried out to consume all new NaOH addition. The 2% NaOH injection and oxygen delignification process steps were repeated until a total of 10% NaOH was consumed. The yield on original waste was 84% and the final recycled pulp product had a kappa of 32.4, a viscosity of 10.6, an ISO brightness of 32.1 and a fiber strength of 11.6 km.

EXAMPLE 4

Commercial waste was reslushed and acid washed as in Example 1. The waste was digested with 12% NaOH and 0.5% MgSO4 for about 120 minutes, at 100° C. and in the presence of 100 psig oxygen gas. The waste digestion was carried out until all the NaOH was consumed or pH decreased to about 10.5. The final pulp product had a kappa of 27, a TAPPI viscosity of 10.4, an ISO brightness of 39.7 and a fiber strength of 11.5 km.

Comparison Example 5

Reslushed commercial waste as in Example 2 was digested with 8% NaOH and 0.5% MgSO4 and delignified with 100 psig oxygen gas at 100° C., until all NaOH was consumed. The yield on waste was 85% and the pulp product had a kappa of 37.7, a TAPPI viscosity of 8.7, an ISO brightness of 27.8 and a fiber strength of 10.5 km.

Comparison Example 6

Treatment of commercial waste as in Example 4 was carried out with a NaOH dosage of 12% but without the acid pretreatment. The pulp product had a kappa of 24, a TAPPI viscosity of 5.2, an ISO brightness of 35.6 and a fiber strength of 7.5 km.

Comparison Example 7

Reslushed commercial waste as in Example 2 was treated with 0.5% DTPA, as taught in U.S. Pat. No. 4,946,556. The DTPA treated waste was then digested with 12% NaOH and 0.5% MgSO4 and delignified with 100 psig oxygen for 120 minutes. The pulp product had a kappa of 23.9 a TAPPI viscosity of 5.9, an ISO brightness of 36.2 and a fiber strength of 7.8 km.

Comparison Example 8

The procedure of Example 7 was followed but employing 0.5% EDTA in place of DTPA. The pulp product had a kappa of 24, a TAPPI viscosity of 5.8 cp, an ISO brightness of 36.4 and a fiber strength of 7.6 km.

Comparison Example 9

The procedure of Example 1 was followed, but immediately after the addition of sulfuric acid, chlorine dioxide in an amount of 1% was added and the resulting mix was maintained at 25° C. for 20 minutes. The dosages of caustic were 6%, 5% and 3%. The pulp product had a kappa of 19.7, a viscosity of 11.8 cp and an ISO brightness of 44.8%.

The results for kappa, brightness, viscosity and fiber strength in the above examples were obtained using the following Standard Testing Methods:

Kappa by Tappi Method T236 or CPPA Method G18
Brightness by Tappi method T452 or CPPA Method E1
Viscosity by Tappi Method T230 or CPPA Method G24
Fiber strength by Handsheets for Physical Tests (Zero Span Tensile Breaking Length) by Tappi Method T205 or CPPA Method C4

With further reference to FIG. 2 there is shown a plot of viscosity of recycled pulp against kappa number for five situations.

The control situation involves the use of caustic in an amount of more than 50% by dry weight, based on the weight of lignin in the waste paper product, in contact with the waste paper product with no acid pretreatment, and no step to lower the exposure of the waste product to the sodium hydroxide. It will be seen that all the viscosities are low and all below 10.

The DTPA plot employs the same conditions as for the control plot but with the inclusion of the chelating agent DTPA in accordance with U.S. Pat. No. 4,946,556. It can be seen that the viscosities are only marginally better than those for the control plot and are still below 10.

The acid plot employs the acid pretreatment of the present invention with a conventional oxygen delignification and without establishment of the special conditions in accordance with the present invention. It can be seen that under these conditions there is a marked improvement over the control and DTPA plots with the viscosity being 10 or more.

The 5X plot is for a process of the invention not employing the acid pretreatment, but employing a scheme of a type illustrated in FIG. 1 but with five separate additions of the caustic so that the exposure of the waste paper product to the caustic is controlled in accordance with the invention. It can be seen that the results are comparable with the results for the acid pretreatment alone.

The A5X and A3X plots are for preferred processes of the invention employing the acid pretreatment and control of the exposure to caustic in five and three dosages based on the type of scheme illustrated in FIG. 1, and it can be seen that these provide the best results in terms of higher viscosity relative to kappa number.

FIG. 2 demonstrates that the invention provides advantages either by use of the acid pretreatment or control of exposure to caustic alone, but provides still better results by employment of both an acid pretreatment and control of exposure to caustic.

I claim:

1. A process for recycling old corrugated containers to produce a cellulosic fiber pulp consisting essentially of:
   i) reslushing old corrugated containers having a kappa number of 80 to 180 with water,
   ii) subjecting the thus reslushed old corrugated containers from i) to oxygen delignification, in the presence of sodium hydroxide at a temperature of 80° C. to 120° C., and an oxygen pressure of 60 to 120 psig for a time effective to lower the kappa number to 20 to 30, said oxygen delignification consisting essentially of exposing said reslushed old corrugated containers in an aqueous vehicle, to oxygen gas in the presence of said sodium hydroxide, in a plurality of sequential oxygen delignification stages, in which the reslushed old corrugated containers are exposed to said sodium hydroxide in sequentially introduced dosages of the sodium hydroxide, each dosage being not more than 50%, by dry weight, of sodium hydroxide, based on the weight of lignin in the old corrugated containers, said reslushed old corrugated containers and aqueous vehicle flowing sequentially through said stages and having a residence time in each stage to permit delignification,
   iii) recovering from ii) a cellulosic fiber pulp having a kappa number of 20 to 30 and a viscosity of 10 to 15 cp.

2. A process according to claim 1, wherein said oxygen delignification in step ii) is for a time of 30 to 120 minutes.

3. A process for recycling old corrugated containers to produce a cellulosic fiber pulp consisting essentially of:
   i) reslushing old corrugated containers, having a kappa number of more than 70, with water,
   ii) subjecting the thus reslushed old corrugated containers from i) to oxygen delignification, in the presence of alkaline material at a temperature of 80° C. to 120° C., and an oxygen pressure of 60 to 120 psig for a time effective to lower the kappa number to 15 to 35, said oxygen delignification consisting essentially of exposing said reslushed corrugated containers in an aqueous vehicle, to oxygen gas in the presence of said alkaline material, in a plurality of sequential oxygen delignification stages, in which the reslushed old corrugated containers are exposed to said alkaline material in sequentially introduced dosages of the alkaline material, each dosage being not more than 50%, by dry weight, of alkaline material, based on the weight of lignin in the old corrugated containers, said reslushed old corrugated containers and aqueous vehicle flowing sequentially through said stages and having a residence time in each stage to permit delignification, and
   iii) recovering from ii), a cellulosic fiber pulp having a kappa number of 15 to 35 and a viscosity of 10 to 15 cp.

4. A process according to claim 3, wherein said alkaline material is aqueous sodium hydroxide.

5. A process according to claim 3, wherein said kappa number in i) is 80 to 180.

6. A process according to claim 3, wherein said oxygen delignification in step ii) is for a time of 30 to 120 minutes.

* * * * *